(12) United States Patent
Ryczek

(10) Patent No.: US 11,992,717 B2
(45) Date of Patent: May 28, 2024

(54) CLOSE PROXIMITY NOZZLE SYSTEM

(71) Applicant: Tyco Fire Products LP, Lansdale, PA (US)

(72) Inventor: Chad L. Ryczek, Oconto Falls, WI (US)

(73) Assignee: Tyco Fire Products LP, Cranston, RI (US)

( * ) Notice: Subject to any disclaimer, the term of this patent is extended or adjusted under 35 U.S.C. 154(b) by 76 days.

(21) Appl. No.: 16/593,448

(22) Filed: Oct. 4, 2019

(65) Prior Publication Data

US 2020/0030647 A1 Jan. 30, 2020

Related U.S. Application Data

(63) Continuation of application No. PCT/IB2019/055977, filed on Jul. 12, 2019.

(60) Provisional application No. 62/697,745, filed on Jul. 13, 2018.

(51) Int. Cl.
*A62C 3/07* (2006.01)
*A62C 35/68* (2006.01)
*B60P 1/04* (2006.01)

(52) U.S. Cl.
CPC .............. *A62C 3/07* (2013.01); *A62C 35/68* (2013.01); *B60P 1/04* (2013.01)

(58) Field of Classification Search
CPC .............. A62C 3/07; A62C 35/68; B60P 1/04
USPC .......................................................... 169/62
See application file for complete search history.

(56) References Cited

U.S. PATENT DOCUMENTS

| 4,248,309 | A | * | 2/1981 | Hofle | A62C 3/07 |
| | | | | | 169/14 |
| 5,685,376 | A | | 11/1997 | Tirronen et al. | |
| 6,981,555 | B2 | | 1/2006 | Smith et al. | |
| 2008/0289836 | A1 | * | 11/2008 | Fong | A62C 3/07 |
| | | | | | 169/62 |
| 2015/0251031 | A1 | * | 9/2015 | Sandahl | A62C 37/00 |
| | | | | | 169/62 |

FOREIGN PATENT DOCUMENTS

| CN | 1137760 A | 12/1996 |
| CN | 202859957 U | 4/2013 |

(Continued)

OTHER PUBLICATIONS

International Search Report and Written Opinion for International Application No. PCT/IB2019/055977, dated Dec. 4, 2019, 14 pages.

*Primary Examiner* — Christopher S Kim
(74) *Attorney, Agent, or Firm* — Foley & Lardner LLP

(57) ABSTRACT

A vehicle includes a chassis, a body coupled to the chassis, a series of tractive elements coupled to the chassis, a hazard coupled to the chassis, and a fire suppression system. The fire suppression system includes a tank configured to contain a volume of fire suppressant, a nozzle having an outlet at least selectively fluidly coupled to the tank and configured to release a spray of the fire suppressant therefrom, and an activator configured to selectively release the fire suppressant from the tank such that at least a portion of the fire suppressant passes through the outlet of the nozzle. The nozzle is oriented such that the spray is directed toward the hazard. The nozzle is positioned less than 8 inches away from the hazard.

20 Claims, 5 Drawing Sheets

(56) References Cited

FOREIGN PATENT DOCUMENTS

| | | |
|---|---|---|
| CN | 104780981 A | 7/2015 |
| FR | 2674441 A1 | 10/1992 |
| WO | WO-95/23630 A1 | 9/1995 |

* cited by examiner

CLOSE PROXIMITY NOZZLE SYSTEM

CROSS-REFERENCE TO RELATED PATENT APPLICATION

This application is a continuation of International Application No. PCT/IB2019/055977, filed Jul. 12, 2019, which claims the benefit of U.S. Provisional Patent Application No. 62/697,745, filed Jul. 13, 2018, both of which are incorporated herein by reference in their entireties.

BACKGROUND

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppressant agent throughout the area. The fire suppressant agent then suppresses or prevents the growth of the fire.

SUMMARY

One embodiment relates to a vehicle including a chassis, a body coupled to the chassis, a series of tractive elements coupled to the chassis, a hazard coupled to the chassis, and a fire suppression system. The fire suppression system includes a tank configured to contain a volume of fire suppressant, a nozzle having an outlet at least selectively fluidly coupled to the tank and configured to release a spray of the fire suppressant therefrom, and an activator configured to selectively release the fire suppressant from the tank such that at least a portion of the fire suppressant passes through the outlet of the nozzle. The nozzle is oriented such that the spray is directed toward the hazard. The nozzle is positioned less than 8 inches away from the hazard.

Another embodiment relates to a fire suppression system for use with a vehicle including a hazard. The fire suppression system includes a tank configured to contain a volume of fire suppressant, a nozzle having an outlet at least selectively fluidly coupled to the tank and configured to release a spray of the fire suppressant therefrom, and an activator configured to selectively release the fire suppressant from the tank such that at least a portion of the fire suppressant passes through the outlet of the nozzle. The nozzle is configured to be oriented such that the spray is directed toward the hazard. The nozzle is configured to have an effective suppression area of at least 3 square feet at the hazard when the nozzle is positioned less than 24 inches away from the hazard.

Another embodiment relates to a vehicle including a chassis, a body coupled to the chassis and defining an enclosure, a series of tractive elements coupled to the chassis, a driver extending within the enclosure and configured to output mechanical energy to drive at least one of the tractive elements, the driver defining a hazard, and a fire suppression system. The fire suppression system includes a tank configured to contain a volume of fire suppressant, a nozzle having an outlet at least selectively fluidly coupled to the tank and configured to release a spray of the fire suppressant therefrom, and an activator configured to selectively release the fire suppressant from the tank such that at least a portion of the fire suppressant passes through the outlet of the nozzle. The outlet is positioned within the enclosure. The nozzle is oriented such that the spray is directed toward the hazard. The nozzle is positioned less than 8 inches away from the hazard and at least 6 inches away from the hazard. The nozzle has a spray angle of approximately 120 degrees. The nozzle is configured to have an effective suppression area of at least 3 square feet at the hazard.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
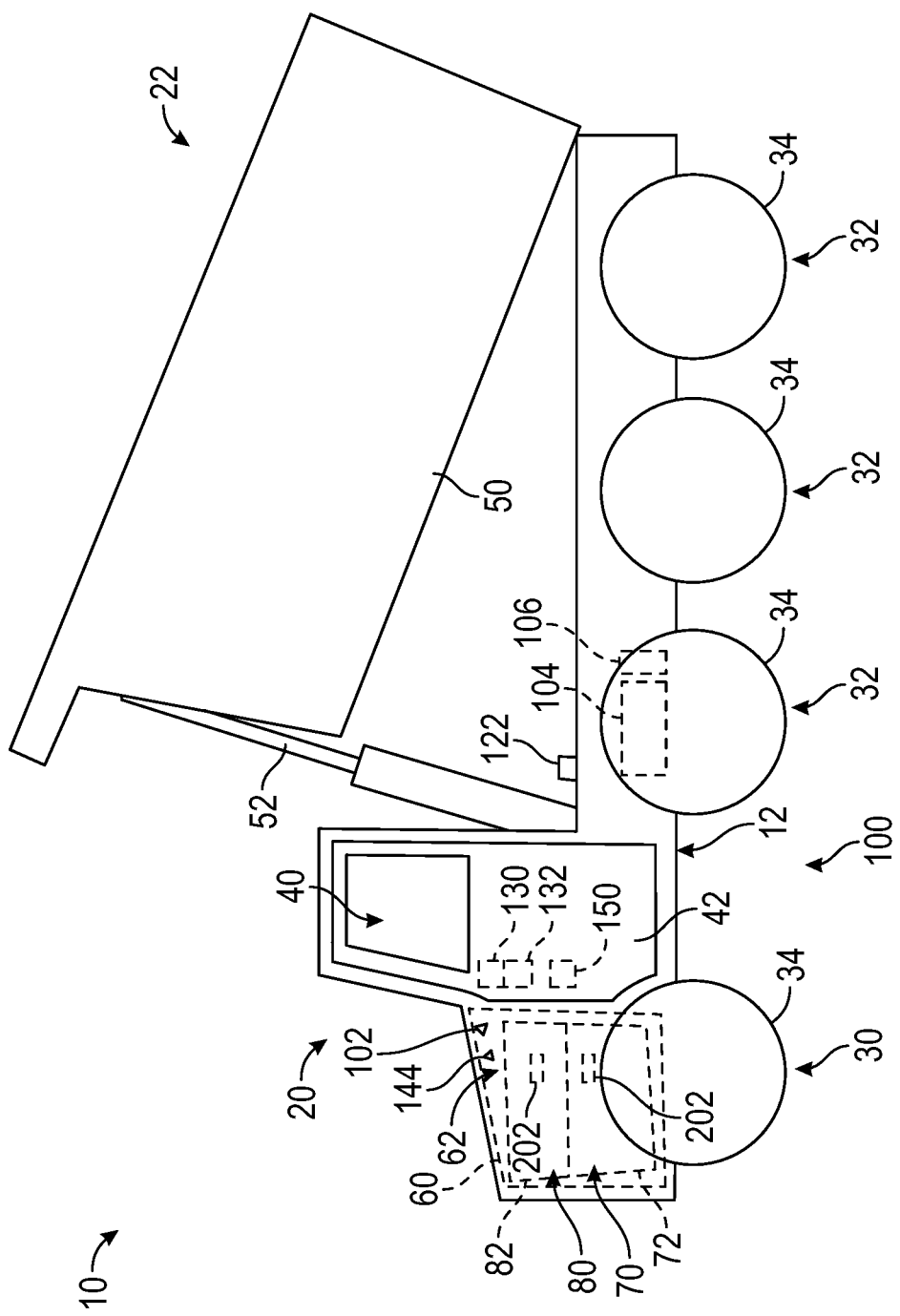
FIG. 1 is a side view of a vehicle including a fire suppression system, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As used herein, the term "hazard" means any component or surface that has a potential to act as fuel, flammable material, or an ignition source and thereby ignite, produce, sustain, or otherwise cause a flame to be emitted therefrom. A hazard can be a component or surface that routinely becomes heated and has the potential to come into contact with a combustible material. By way of example, the hazard can be an engine component that is routinely heated (e.g., an engine block, a turbocharger, a supercharger, an exhaust component, a pump, a filter, etc.) and that may be positioned adjacent a hose, pipe, or other type of conduit that has the potential to leak a combustible fluid (e.g., fuel, hydraulic oil, engine oil, etc.). By way of another example, the hazard can be an engine component that is routinely heated and that may be positioned such that flammable material from outside of the vehicle (e.g., grass clippings, wood chips, coal dust, refuse, etc.) can accumulate atop or otherwise in contact with the engine component.

Overview

Vehicles are associated with a number of onboard hazards that have the potential to produce fires. By way of example, vehicles include components that reach elevated temperatures during normal use. If the heated surfaces of these components come into contact with flammable materials, such as fuel or hydraulic oil, the flammable materials can combust, causing fires within the vehicle. Fire suppression systems can be installed onboard vehicles and configured to suppress such onboard fires.

Many vehicle components that are heated during use are contained or extend within specific areas, compartments, or enclosures of the vehicle, such as an engine compartment, or within other vehicle spaces. Onboard fire suppression systems can include one or more fixed nozzles that suppress fires caused by hazards within the enclosures. Because some enclosures are often open to the surrounding atmosphere, fires within some enclosures cannot be effectively suppressed by filling or flooding the enclosures with agent. Instead, fire suppressant agent is continuously supplied by the nozzles to select hazards for an extended period of time. Such nozzles are oriented such that they direct a spray of fire fighting agent, fire suppressant, or fire suppressant agent onto the hazard, suppressing the fire and cooling the hazard to prevent subsequent ignitions. The nozzles are oriented such that the spray passes directly from the nozzle onto the hazard.

Trends in vehicle technology often reduce the unoccupied volume within engine compartments. Engines are increasing in size, and additional components such as turbochargers, superchargers, and emission-regulating components occupy additional space within the engine compartment. The present disclosure relates to a fire suppression system that utilizes nozzles having wide spray angles to effectively suppress fires caused by hazards within a large area while remaining in close proximity to the hazards. Accordingly, this fire suppression system operates effectively within the confines of an engine compartment, enclosure, or other vehicle space. Other fire suppression systems utilize nozzles having relatively narrow spray angles. This reduces the area that can effectively be protected by the nozzles within a confined space. This in turn requires the inclusion of additional nozzles, placing nozzles at unideal angles, and/or leaving certain hazards unprotected.

Vehicle

Referring to FIG. 1, a vehicle 10 is shown according to an exemplary embodiment. The vehicle 10 may be any type of vehicle, such as a commercial vehicle, a farm vehicle, an industrial vehicle, or a consumer vehicle. Such vehicles can include, but are not limited to, draglines, slag pot carriers, slab carriers, tunnel boring machines, waste management equipment, forestry vehicles, hydraulic excavators, haul trucks, wheeled loaders, dozers, scoop trams, shuttle cars, public transportation vehicles, over-the-road trucks, cargo transport vehicles, graders, dump trucks, and consumer passenger vehicles.

In the embodiment shown in FIG. 1, the vehicle 10 is a dump truck. The vehicle 10 includes a chassis, shown as frame 12, extending longitudinally along the vehicle 10. The frame 12 supports a first portion of the vehicle 10, shown as body 20. In some embodiments, the frame 12 additionally supports a second portion of the vehicle 10, shown as equipment 22. In other embodiments, the equipment 22 is omitted. As shown in FIG. 1, the body 20 is positioned near the front of the frame 12 with respect to the direction of travel of the vehicle 10, and the equipment 22 is positioned rearward of the body 20. In other embodiments, the body 20 extends rearward of the equipment 22.

The vehicle 10 further includes a series of tractive assemblies, shown as front tractive assembly 30 and rear tractive assemblies 32. As shown, the vehicle 10 includes one front tractive assembly 30 and three rear tractive assemblies 32. In other embodiments, the vehicle 10 includes more or fewer front tractive assemblies 30 and/or rear tractive assemblies 32. The front tractive assembly 30 and the rear tractive assemblies 32 each include two or more tractive elements (e.g., wheels, tracks, etc.), shown as wheel and tire assemblies 34. The wheel and tire assemblies 34 are rotatably coupled to the frame 12 and engage the ground. The wheel and tire assemblies 34 support the frame 12, the body 20, and the equipment 22. The front tractive assembly 30 and the rear tractive assemblies 32 can include differentials, drive shafts, bearings, wheel hubs, brakes, and other components.

The body 20 includes a cabin, shown as front cabin 40. The front cabin 40 is configured to house one or more operators throughout operation of the vehicle 10. The front cabin 40 can include components that facilitate operation of the vehicle 10, such as seats, controls for driving the vehicle 10 (e.g., displays, gauges, a steering wheel, pedals, shift levers, etc.), and/or controls for operating the equipment 22 (e.g., touchscreens, switches, knobs, buttons, joysticks, etc.). The body 20 can include one or more doors 42 that open and close to selectively facilitate or prevent access to the front cabin 40. Alternatively, the vehicle 10 may be an autonomous or semiautonomous vehicle. Accordingly, certain processes, such as steering, braking, and accelerating the vehicle 10 and controlling the equipment 22 may be controlled by a controller onboard or offboard the vehicle. The controller may perform such operations without, or with reduced input from, an operator. In such embodiments, certain components may be removed from the front cabin 40 or the front cabin 40 may be omitted entirely.

The components included in the equipment 22 vary based upon the intended use of the vehicle 10. In the embodiment shown in FIG. 1, the vehicle 10 is a dump truck configured to haul and deposit material (e.g., dirt, gravel, sand, coal, etc.). The equipment 22 includes a container, shown as bed 50, that is configured to contain a volume of material. The bed 50 can have an opening along a top side to facilitate depositing material into the bed 50 and an opening along a rear side to facilitate dumping material. The bed 50 is pivotally coupled to the frame 12. The equipment 22 further includes a linear actuator, shown as hydraulic cylinder 52, that is coupled to the frame 12 and the bed 50. The hydraulic cylinder 52 is configured to extend and retract to rotate the bed 50 relative to the frame 12 between a raised position and a lowered position. In the lowered position, the bed 50 is configured to store material for transport. In the raised position, shown in FIG. 1, the bed 50 is configured to dump the material out through the opening along the rear side of the bed 50.

The body 20 further defines an enclosure, shown as engine compartment 60, defining a volume 62 that is at least partially enclosed by the engine compartment 60. As shown, the engine compartment 60 is positioned forward of the front cabin 40 and the equipment 22. In other embodiments, the engine compartment 60 is positioned rearward of the front cabin 40 and/or the equipment 22. The engine compartment 60 can include one or more structural members (e.g., frame rails, support members, brackets, etc.), coverings (e.g., sheet metal that extends between structural members, firewalls, body panels, grills, etc.), movable members (e.g., doors, hoods, etc.), or other components coupled to the frame 12, all of which cooperate to define the volume 62. The volume 62 can be accessible, selectively accessible, or inaccessible by an operator positioned outside of the vehicle 10. By way of example, a door may be movable to selectively permit access to the volume 62. In other embodiments, enclosed or partially enclosed volumes are defined by an enclosure of the vehicle 10 other than the engine compartment 60. By way of example, such enclosures can include lubrication rooms, storage areas, and the front cabin 40.

According to an exemplary embodiment, the vehicle 10 includes a first drive system, shown as powertrain 70. The powertrain 70 may include a primary driver, shown as engine 72. The engine 72 receives fuel (e.g., diesel, gasoline, etc.) from a fuel tank and combusts the fuel to generate mechanical energy. In other embodiments, the primary driver is an electric motor that consumes electrical energy (e.g., stored in a battery, from a generator, etc.) to generate mechanical energy. The powertrain 70 further includes a transmission that receives the mechanical energy and provides a rotational mechanical energy output (e.g., at a different speed, torque, and/or direction of rotation than that of the engine 72). The transmission can be rotationally coupled to a transfer case assembly and one or more drive shafts. The one or more drive shafts can be coupled to one or more differentials configured to transfer the rotational mechanical energy from the one or more drive shafts to the front tractive assembly 30 and/or the rear tractive assemblies 32. The front tractive assembly 30 and/or the rear tractive assemblies 32 then propel the vehicle 10. According to an exemplary embodiment, the engine 72 is an internal combustion engine that utilizes compression-ignition of diesel fuel. In alternative embodiments, the engine 72 is another type of device (e.g., a fuel cell, an electric motor, a spark-ignition engine, etc.) that utilizes a different power source (e.g., compressed natural gas, gasoline, hydrogen, electricity, etc.). The powertrain 70 of the vehicle 10 can be a hybrid powertrain or a non-hybrid powertrain (e.g., a fully electric powertrain, a powertrain powered exclusively by an internal combustion engine, etc.).

In some embodiments, the vehicle 10 includes a second drive system, shown as equipment drive system 80. The equipment drive system 80 is configured to power actuation of the equipment 22. The equipment drive system 80 includes a driver, shown as pump 82. The pump 82 is a hydraulic pump configured to supply pressurized hydraulic fluid to and/or remove pressurized hydraulic fluid from the hydraulic cylinder 52 to raise and lower the bed 50. The pump 82 can be directly powered by the engine 72, can be powered by another energy source (e.g., a second engine, an electric motor powered by energy stored in a battery, etc.). In other embodiments, the equipment drive system 80 is configured to provide a different type of energy to power actuation of the equipment 22 (e.g., pressurized gas, electrical energy, a rotating shaft, etc.). Accordingly, in such embodiments, the driver of the equipment drive system 80 may instead be a compressor, a generator, an electric motor, or another type of driver. Alternatively, the pump 82 can be omitted, and the equipment drive system 80 may be driven directly by the engine 72 (e.g., a through a drive shaft).

The powertrain 70 and/or the equipment drive system 80 extend at least partially within the volume 62 defined by the engine compartment 60. As shown in FIG. 1, the engine 72 and the pump 82 are positioned within the engine compartment 60. Other components of the powertrain 70 (e.g., the transmission, driveshafts, etc.) extend outside of the engine compartment 60. Other components of the equipment drive system 80 (e.g., hydraulic lines, valves, etc.) extend outside of the engine compartment 60. In other embodiments, the equipment drive system 80 is positioned completely within or completely outside of the engine compartment 60.

Fire Suppression System

Throughout operation, one or more components or surfaces of the powertrain 70 and/or the equipment drive system 80 have the potential to supply flammable material or act as an ignition source, such that a flame is emitted therefrom. Such flames can occur as a result of malfunctioning components, buildup of outside sources of flammable material, or through other circumstances. By way of example, a fuel line or a hydraulic fluid line can rupture, spraying fuel or hydraulic fluid that acts as a flammable material to fuel a fire. By way of another example, flammable material from outside of the vehicle 10 (e.g., sawdust, grass clippings, coal dust, etc.) can build up and fuel a fire. Throughout operation, many components of the powertrain 70 and the equipment drive system 80 regularly reach elevated temperatures. When flammable materials come into contact with such heated components and surfaces, the flammable materials can ignite, causing flames to be emitted. Any component or surface that has a potential to act as fuel, flammable material, or an ignition source and thereby ignite, produce, sustain, or otherwise cause an undesired flame to be emitted therefrom is referred to herein as a "hazard."

Components of the vehicle 10, including components of the powertrain 70 and the equipment drive system 80 can act as hazards. Such components can have the potential to supply flammable materials, such as oil or fuel. Components within the vehicle 10 can reach elevated temperatures due to the combustion of fuel (e.g., contact with the combusting fuel, contact with exhaust gasses, etc.), due to electrical resistance, due to resistance within a hydraulic or pneumatic circuit, due to friction, or through other sources. Potential hazards within the vehicle 10 include, but are not limited to, heated surfaces of a block of the engine 72, motors, turbochargers, superchargers, filters, exhaust components, radiators, pumps, compressors, valves, wires, fluid lines, and filters.

Figure 2:
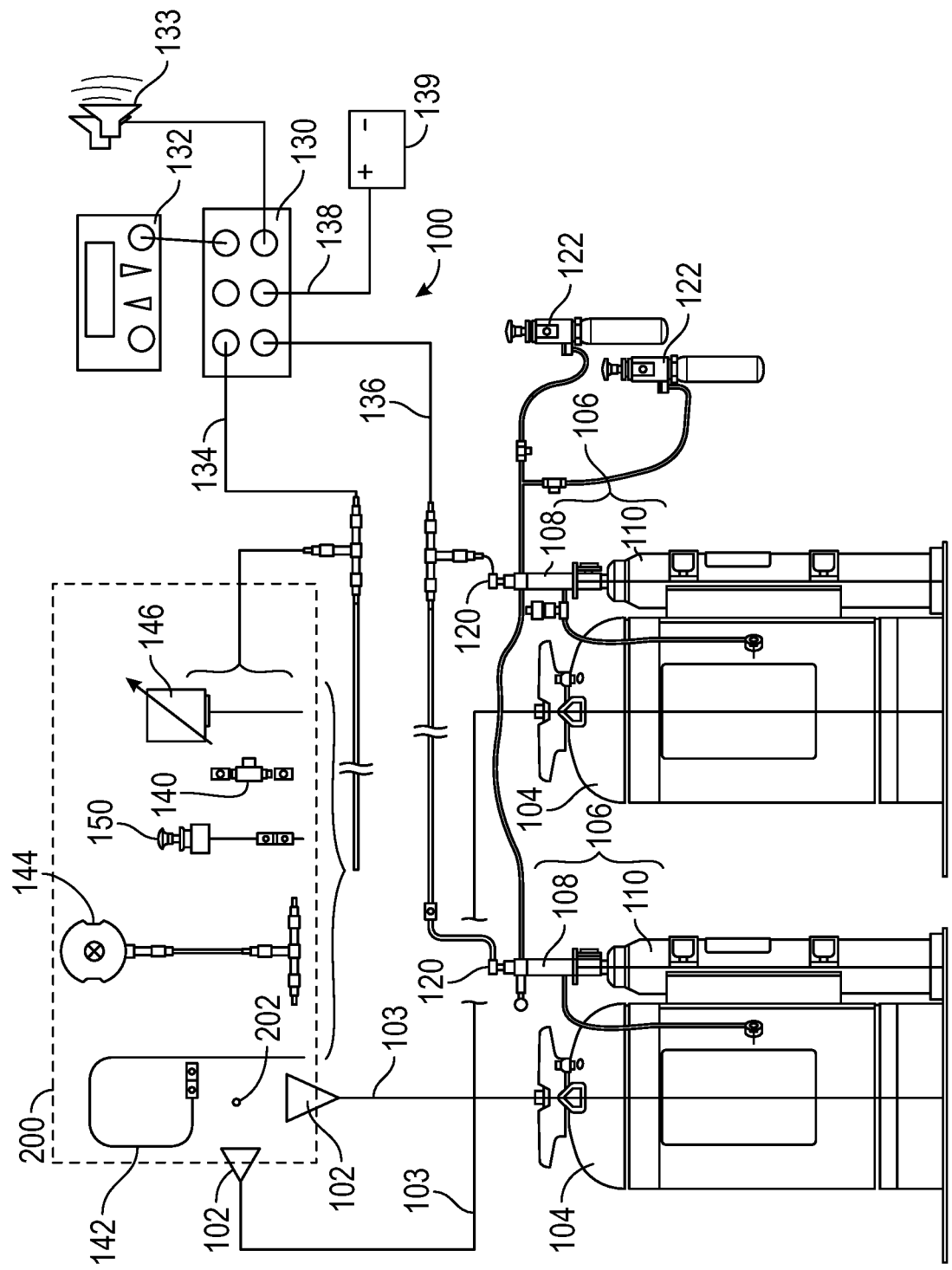
FIG. 2 is a schematic of the fire suppression system of FIG. 1.

Referring to FIG. 2, the vehicle 10 further includes a fire suppression system 100. The fire suppression system 100 supplies fire suppressant agent to one or more nozzles 102 through fluid conduits (e.g., pipes, hoses, etc.), shown as hoses 103, to protect a hazard area 200 containing one or more hazards 202. As shown, the fire suppression system 100 includes one or more vessels, cylinders, or storage tanks 104 containing a fire suppressant agent, such as for example a chemical agent or water. A pressurized cylinder assembly 106 is configured to store pressurized expellant gas for pressurizing a corresponding one of the storage tanks 104 for delivery of the agent under an operating pressure to the nozzles 102 to address a fire in the hazard 202. As shown, the pressurized cylinder assemblies 106 are positioned outside of the storage tanks 104. In other embodiments, pressurized expellant gas is stored within the storage tanks 104. In one embodiment, each pressurized cylinder assembly 106 includes an activator, shown as rupturing device 108, which punctures a rupture disc of a pressurized cylinder 110 containing a pressurized expellant gas, such as for example nitrogen, to pressurize the corresponding storage tank 104 for delivery of the fire suppressant agent under pressure.

In order to operate the rupturing device 108, the system 100 provides for automatic actuation and manual operation of the rupturing device 108 to provide for respective automated and manual delivery of the chemical agent in response to detection of a fire for protection of the hazard 202. In one embodiment, the rupturing device 108 includes a puncturing pin or member that is driven into the rupture disc of the pressurized cylinder 110 for release of the pressurized expellant gas. The puncturing pin of the rupturing device 108 may be driven electrically or pneumatically to puncture the rupture disc of the pressurized cylinder 110.

In another embodiment, the activator is instead a valve or another type of device that selectively fluidly couples the storage tank 104 and the pressurized cylinder 110.

In one embodiment, the rupturing device 108 includes a protracted actuation device (PAD) 120 for driving the puncturing pin of the rupturing device 108 into the rupture disc. The PAD 120 generally includes an electrically coupled rod or member that is disposed above the puncturing pin. When an electrical signal is delivered to the PAD 120, the rod of the PAD is driven directly or indirectly into the puncturing pin which punctures the rupture disc of the pressurized cylinder 110. The system 100 can provide for automatic and/or manual operation of the PAD 120. The system 100 can further provide for one or more remote manual operating stations 122 to manually actuate the system 100. The manual operating stations 122 can rupture a canister of pressurized gas, for example, nitrogen at 1800 psi, to fill and pressurize an actuation line which in turn drives the puncturing pin of the rupturing device 108 into the rupturing disc thereby actuating the system 100.

In an alternative embodiment, the pressurized cylinder assembly 106 is omitted, and the fire suppressant agent is otherwise expelled from the storage tank 104. By way of example, the storage tank 104 may be filled with a pressurized expellant gas, and the expellant gas may force the fire suppressant agent out of the storage tank 104 and through the hose 103. In such an embodiment, the system 100 may utilize a different type of activator instead of the rupturing device 108. By way of example, the system 100 may include a valve positioned downstream of the storage tank 104 (e.g., along one of the hoses 103, etc.) that selectively prevents flow of fire suppressant agent through the hoses 103 and out of the nozzles 102.

Referring again to FIG. 2, the system 100 includes a controller for automated and/or manual operation and monitoring of the system 100. In one embodiment, the system 100 includes a centralized controller or interface control module (ICM) 130. The system 100 can include a display device 132 coupled to the ICM 130 which displays information to a user and provides for user input to the ICM 130. In some embodiments, a user can provide a user input to the display device 132 to manually activate the fire suppression system 100. An audio alarm or speaker 133 can also be coupled to the ICM 130 to provide for an audio alert regarding the status of the system 100.

To provide for fire detection and actuation of the pressurized cylinder assemblies 106 and the fire suppression system 100, the ICM 130 can further include an input data bus 134 coupled to one or more detection sensors, an output data bus 136 coupled to the PADs 120, and an input power supply bus 138 coupled to a power source, shown as battery 139, for powering the ICM 130 and the control and actuating signals. The input bus 134 provides for interconnection of digital and analog devices to the ICM 130. The input bus 134 can include one or more fire detection devices (e.g., sensors) and/or manual actuating devices 150. The fire detection devices of the system 100 can include analog and digital devices for various modes for fire detection including: (i) spot thermal detectors 140 to determine when the surrounding air exceeds a set temperature, (ii) linear detection wire 142 which conveys a detection signal from two wires that are brought into contact upon a separating insulation material melting in the presence of a fire, (iii) optical sensors 144 which differentiate between open flames and hydrocarbon signatures, and (iv) a linear pressure detector 146 in which pressure of an air line increases in the presence of sufficient heat. A manual actuating device 150 is shown as a manual push button which sends an actuating signal to the ICM 130 for output of an electrical actuating signal along to the PAD 120 of one or more of the pressurized cylinder assemblies 106. Accordingly, the system 100 provides for manual actuation of the system 100 by transmission of an electrical signal to the PAD 120. Together the fire detection devices and manual actuating devices 150 define a detecting circuit of the system 100 for automatic and/or manual detection of a fire event.

In some embodiments, the fire suppression system 100 includes mechanical fire detection devices. By way of example, the fire suppression system 100 can include a fusible link coupled to a cable or other type of tensile member that is held in tension. When the fusible link is exposed to a fire, solder within the fusible link melts, releasing tension on the cable. This change in tension can act as an input to the ICM 130 (e.g., through a strain gage or load cell). Alternatively, the cable can be coupled to the rupturing device 108, and the rupturing device 108 can be configured to pierce the rupture disc in response to a release of the tension on the cable.

Referring again to FIG. 2, the ICM 130 can be a programmable controller having a processor and a memory device. The ICM 130 can receive input signals on the input bus 134 from the fire detection devices for processing and where appropriate, generating an actuating signal to each PAD 120 along the output bus 136. In operation, upon detection of a fire event (e.g., automatically or manually), the ICM 130 activates each PAD 120, causing the rupturing device 108 to fluidly couple the pressurized cylinder 110 and the storage tank 104. In embodiments where the pressurized cylinder assembly 106 is omitted, the ICM 130 may instead interact with (e.g., activate) a different type of activator. Alternatively, the rupturing devices 108 can be activated mechanically using the manual operating stations 122. The expellant gas forces the fire suppressant agent out through the hoses 103 and the nozzles 102, suppressing any fires near the hazards 202. The fire suppressant agent is expelled until one or both of the storage tank 104 and the pressurized cylinder 110 are depleted.

The storage tank 104 and/or the pressurized cylinder 110 can be sized to correspond to the number of nozzles 102 present in the system 100 such that a desired volume of fire suppressant agent is expelled through each nozzle 102. In some embodiments, the storage tank 104 has a capacity of 3, 5, 10, 15, or 30 gallons. These capacities can correspond with the use of between 6 and 20 nozzles 102. The average time required to completely discharge the storage tank 104 can range from between 20 and 60 seconds.

Referring back to FIG. 1, the fire suppression system 100 is included onboard the vehicle 10. Accordingly, the fire suppression system 100 stays with the vehicle 10 to protect the vehicle 10 during periods of operation and/or periods of inactivity (e.g., storage, transport, etc.). As shown, the nozzle 102 is positioned within the engine compartment 60 to protect hazards included in the powertrain 70 and the equipment drive system 80. An optical sensor 144 is positioned within the engine compartment 60 to detect fires within the engine compartment 60. Other detection devices (e.g., the spot thermal detectors 140, the linear detection wires 142, the linear pressure detector 146, etc.) can additionally or alternatively be used. Nozzles 102 and sensors can additionally be included in other areas of the vehicle 10 to protect hazards located elsewhere within the vehicle 10. The storage tanks 104 and the pressurized cylinder assembly 106 are coupled to the frame 12 and positioned outside of the engine compartment 60. The ICM 130 and the display device 132 are positioned within the front cabin 40 to facilitate access by an operator of the vehicle 10. A manual actuating device 150 is positioned within the front cabin 40, and a manual operating station 122 is coupled to the frame 12 outside the front cabin 40 to facilitate manual activation of the fire suppression system 100 from anywhere on the vehicle 10. It should be understood that the locations of these components shown in FIG. 1 are exemplary only, and the fire suppression system 100 can be otherwise positioned within the vehicle 10 in other embodiments.

Additionally or alternatively, the vehicle 10 can include nozzles 102 positioned to protect hazards 202 positioned outside of the engine compartment 60. Such nozzles 102 and hazards 202 can be positioned within enclosures of the vehicle 10 other than the engine compartment 60 (e.g., lubrication rooms, enclosures that contain components of the equipment drive system 80 but do not contain the engine 72, etc.). Alternatively, the nozzles 102 and the hazards 202 can be positioned outside of enclosures and exposed to the surrounding environment. Examples of hazards 202 that can be positioned outside of the engine compartment 60 and/or other enclosures include brakes, hydraulic pumps, filters, batteries, tires, mobile generators, and conveyors.

Figure 5:
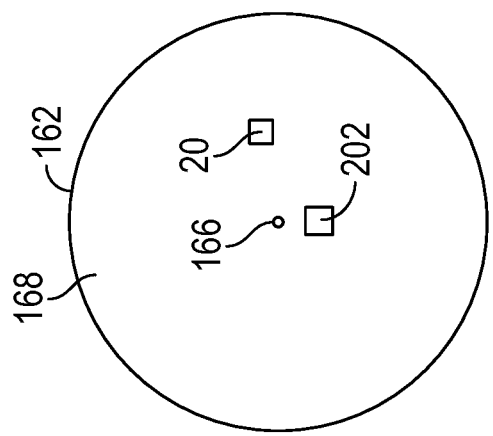
FIG. 5 is a top view of the spray of FIG. 3.
Figure 4:
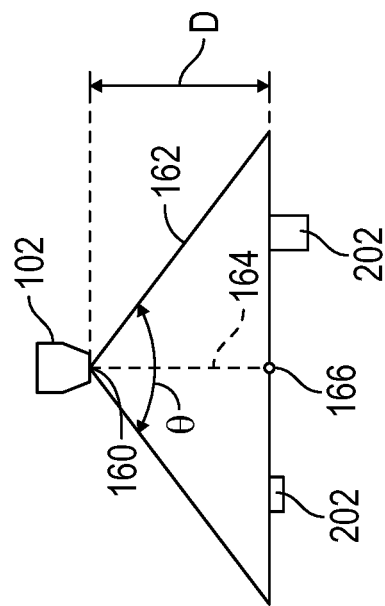
FIG. 4 is a side view of the spray of FIG. 3.
Figure 3:
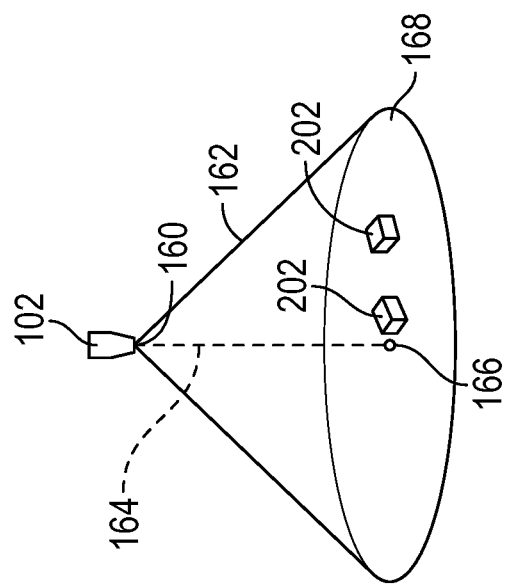
FIG. 3 is a perspective view of a spray of a nozzle of the fire suppression system of FIG. 1, according to an exemplary embodiment.

Referring to FIGS. 3-5, each nozzle 102 has an outlet 160, from which a spray 162 of fire suppressant agent is released during activation of the fire suppression system 100. The outlet 160 is fluidly coupled to the hoses 103 such that fire suppressant agent can be supplied to the outlet 160 from the storage tanks 104. The spray 162 extends along an axis 164 toward a point 166. The axis 164 is oriented generally toward one or more hazards 202, such that the spray 162 suppresses any fires and prevents subsequent ignitions caused by the hazards 202. The spray 162 directly blankets or covers an area, shown as blanketed area 168, with fire suppressant agent. The blanketed area 168 is defined perpendicular to the axis 164. In one embodiment, the blanketed area 168 is circular. The spray 162 further has a coverage area or effective suppression area at the hazard 202. The spray 162 is effective at suppressing fires located within the effective suppression area. Accordingly, if a hazard 202 is located within the effective suppression area, the hazard 202 is protected by the spray 162. The effective suppression area may be larger than and extend outside of the blanketed area 168. As such, a hazard 202 located outside of the blanketed area 168 can still be protected by the spray 162. The effective suppression area may be circular, similar to the blanketed area 168. Alternatively, the effective suppression may have another shape (e.g., organically shaped, square, triangular, etc.).

The blanketed area 168 of the spray 162 increases in size as the spray 162 extends along the axis 164 away from the outlet 160. In the embodiment shown in FIGS. 3-5, the nozzle 102 is configured such that the spray 162 is substantially conical and centered about the axis 164. The spray 162 has a spray angle θ, defined as shown in FIG. 4. As the spray angle θ increases, the blanketed area 168 at a given distance from the outlet 160 increases. Conventional nozzles offer only relatively narrow spray angles (e.g., approximately 45 degrees). The spray angle θ of the nozzle 102 may be greater than 45 degrees. In some embodiments, the spray angle θ is between 90 and 150 degrees. In some embodiments, the spray angle θ is between 110 and 130 degrees. In one embodiment, the spray angle θ is approximately 120 degrees.

Referring to FIG. 4, due to the relatively wide spray angle θ, the nozzle 102 can be located in close proximity to the hazards 202 while having a relatively large effective suppression area. The nozzle 102 is placed such that the outlet 160 is a distance D away from the nearest hazard 202. The distance D is measured along the axis 164. The nozzle 102 can be placed such that distance D is less than 24 inches. In some embodiments, the distance D is less than 12 inches. In some embodiments, the distance D is less than 8 inches. In some embodiments, the distance D is at least 6 inches. In one embodiment, the distance D is approximately 6 inches. In some embodiments, the effective suppression area is at least 3 square feet at the distance D (i.e., at the nearest hazard 202). By way of example, the effective suppression area may be 3 square feet, and the effective suppression area may include all of the blanketed area 168. In some embodiments, the effective suppression area is at least 7 square feet at the distance D. The size of the effective suppression area may be selected based upon the type of area that is desired to be covered. By way of example, a user may select a nozzle 102 having an effective suppression area of 3 square feet for a smaller area, whereas the user may select a nozzle 102 having an effective suppression area of 7 square feet when protecting a smaller area. Having the ability to select different effective suppression areas may facilitate covering different sized hazards with minimal overspray beyond the desired coverage area.

The nozzle 102 is configured such that the fire suppression agent is substantially evenly distributed across the blanketed area 168 (i.e., the spray density is substantially consistent throughout the spray 162). In some embodiments, this is accomplished by the inclusion of a vane within the nozzle 102 (e.g., positioned within the outlet 160, etc.). Having a consistent spray density facilitates providing sufficient protection to all hazards 202 located within the blanketed area 168. Conventional fire suppression systems are not capable of such large spray angles while maintaining consistent spray densities throughout their blanketed areas. As discovered through testing during the development of the nozzle 102, simply expanding the outlet of a conventional nozzle to have a widened spray angle (e.g., through machining, etc.) does not result in a consistent spray density. Rather, increasing the spray angle of a standard nozzle can cause a greater concentration of fire suppressant agent to be supplied to certain areas (e.g., near the edges of the blanketed area) while less or no fire suppressant agent is supplied to other areas. This may prevent the nozzle from suppressing fires in certain areas or require a greater volume of fire suppressant agent to adequately protect all hazards within the blanketed area. This increases the weight and cost of the fire suppression system, thereby increasing the load on the vehicle.

Additionally, during testing of the nozzle 102, the nozzle 102 was discovered to have another unexpected benefit. In this testing, the cooling performance of the nozzle 102 was compared to that of a conventional nozzle, with the expectation that the cooling performance of both nozzles would be approximately the same. With the nozzle 102 positioned 6 inches from a hazard and the conventional nozzle positioned at the conventional, relatively large distance from the hazard, the cooling of the nozzle 102 was more effective than that of the conventional nozzle. Specifically, the nozzle 102 was able to cool a hazard faster and able to cool the hazard to an overall lower temperature than the conventional nozzle under similar conditions. Decreasing the temperature of a hazard is advantageous, as this lessens the likelihood that the hazard will cause a flammable material to reignite after an initial fire is extinguished by a fire suppression system.

Figure 6:
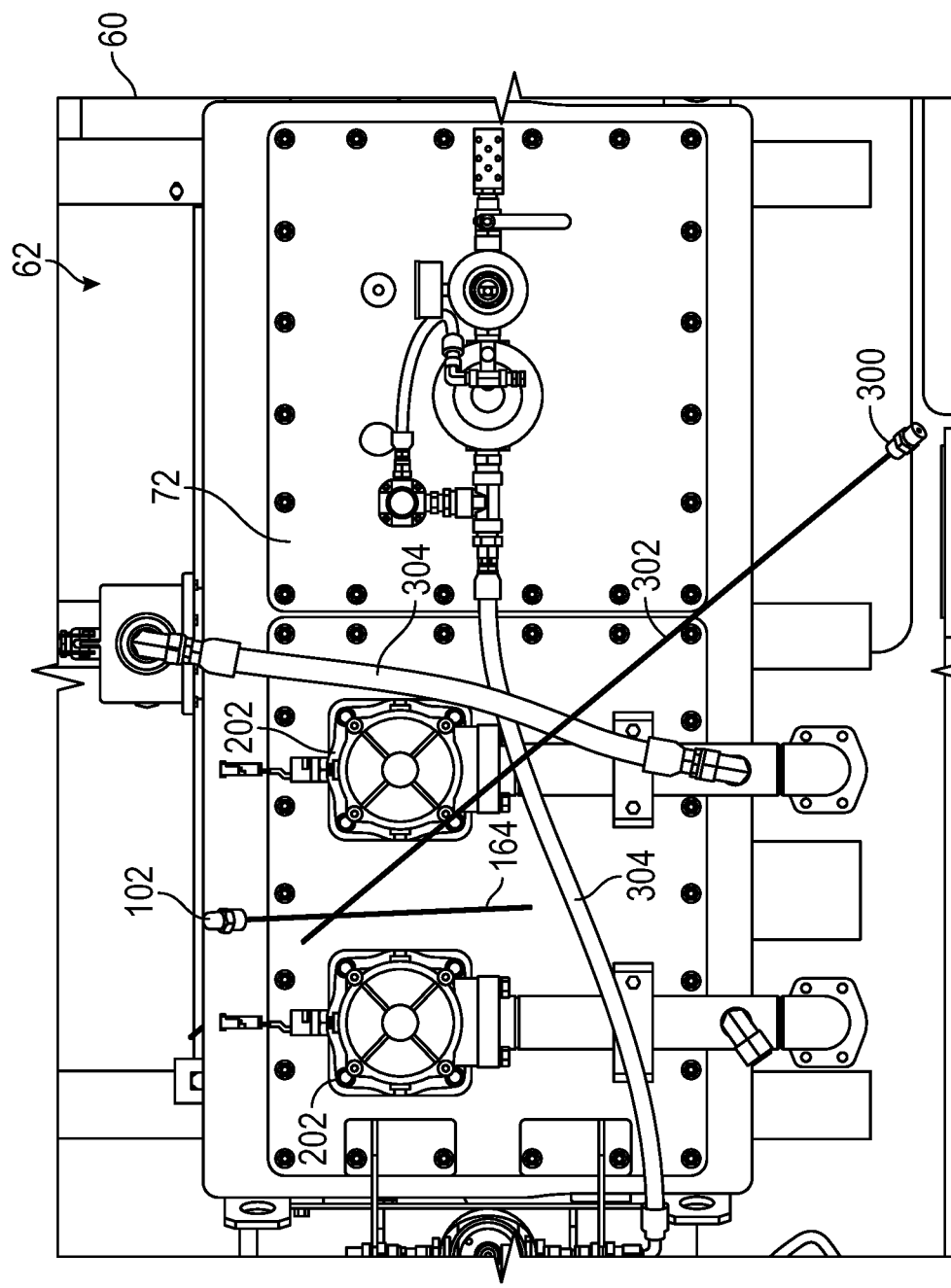
FIG. 6 is a top view of a first area of an engine compartment of the vehicle of FIG. 1, according to an exemplary embodiment.
Figure 7:
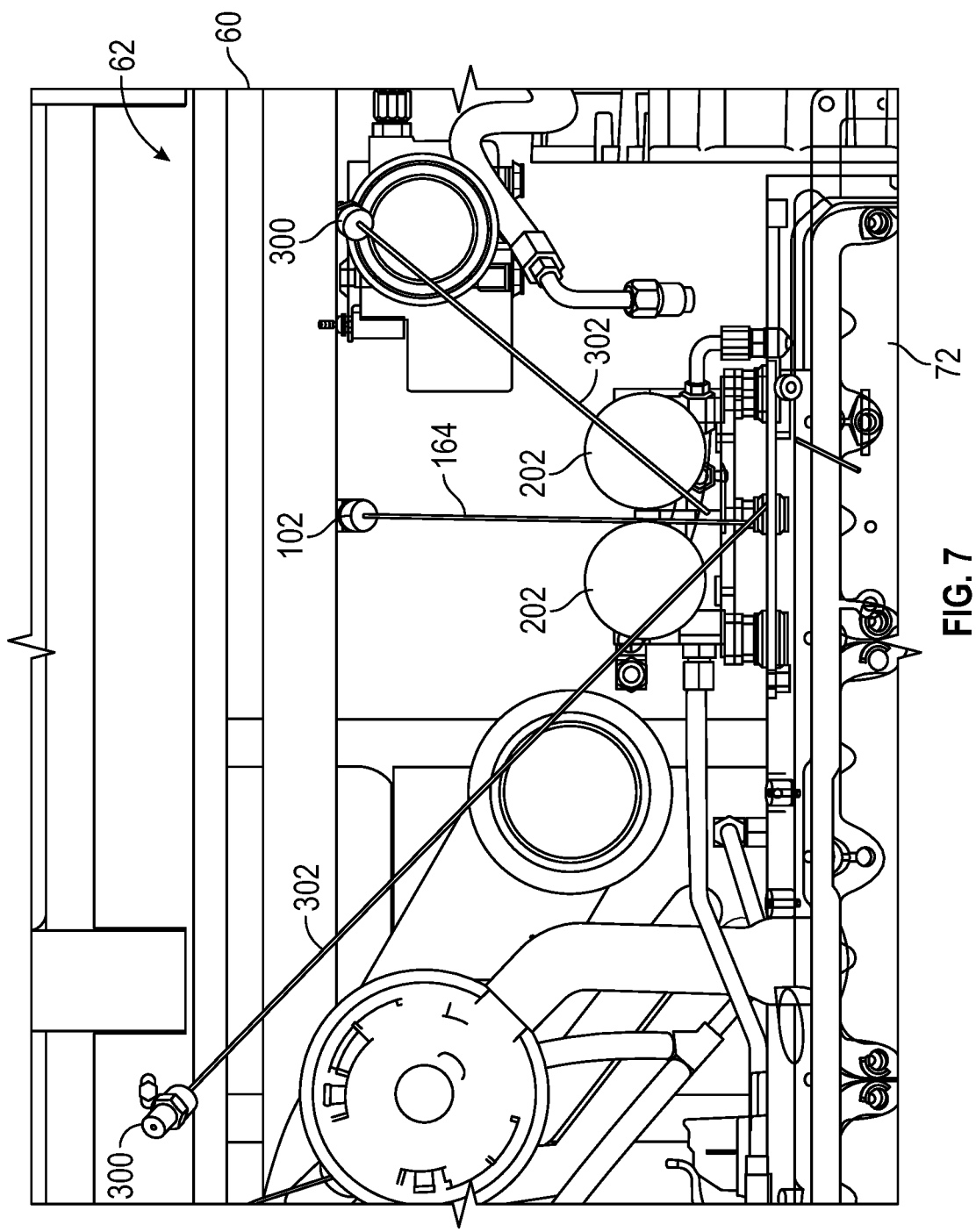
FIG. 7 is a top view of a second area of the engine compartment of FIG. 6, according to an exemplary embodiment.

FIGS. 6 and 7 illustrate the position of the nozzle 102 within the engine compartment 60. In FIG. 6, the nozzle 102 is located at a fixed position and orientation within the engine compartment 60. The nozzle 102 is oriented such that spray 162 fully covers two hazards 202, which are shown as pump stacks. Another type of nozzle, shown as nozzle 300, is also shown in FIG. 6. The nozzle 300 sprays along an axis 302. The nozzle 300 has a much narrower spray angle (e.g., 45 degrees) than the spray angle θ of the nozzle 102. Accordingly, the spray of the nozzle 300 is much narrower than the spray 162. In order for the spray of the nozzle 300 to fully cover the hazards 202, the nozzle 300 must be moved farther away from the hazards 202 than the nozzle 102. If the nozzle 300 were to be positioned closer to the hazards 202, the effective suppression area of the nozzle 300 would be reduced, and one or both of the hazards 202 would not be fully protected. The nozzle 102, however, has an effective suppression area large enough to protect both hazards when only a short distance away from the hazards 202. In some embodiments, the nozzle 102 can be moved four times closer to the hazard 202 than the nozzle 300 without a reduction in effective suppression area. As the space within the engine compartment 60 is finite, the nozzle 102 can be positioned in a much larger range of locations than the nozzle 300 while still covering both of the hazards 202. In the embodiment shown in FIG. 6, the nozzle 102 has a clear path to spray onto the hazards 202, while the nozzle 300 is forced to be positioned such that the spray is obstructed by multiple obstacles, shown as hoses 304, if the nozzle 300 is to have a sufficient effective suppression area.

Referring to FIG. 7, the nozzle 102 is located at another fixed position and orientation within the engine compartment 60. In FIG. 7, the nozzle 102 fully covers two hazards 202, shown as filters. Again, both hazards 202 are able to be covered using a single nozzle 102. However, due to the size of the engine compartment 60 and the placement of components within it, a single nozzle 300 cannot be placed far enough from the hazards 202 to have an effective suppression area large enough to completely cover both of the hazards 202. Instead, a pair of nozzles 300 are required. Because only one nozzle 102 is required, a smaller volume of fire suppressant agent is required to adequately suppress fires at the hazards 202 in comparison to a system that uses two of the nozzles 300. Because all of the agent is carried onboard the vehicle 10 in the storage tanks 104, this additionally reduces the required size of the storage tanks 104. The reduced volume of fire suppressant agent and the reduced size of the storage tank 104 reduces the weight of the fire suppression system 100, increasing the payload capacity of the vehicle 10. This reduces the amount of fuel consumed by the vehicle 10, which reduces cost, and facilitates transferring more material at a time.

In addition to protecting hazards 202 within the engine compartment 60, the fire suppression system 100 can be used to protect hazards 202 elsewhere on the vehicle 10. By way of example, one or more nozzles 102 and hazards 202 can be positioned in enclosures elsewhere on the vehicle 10 (e.g., lubrication rooms, storage areas, the front cabin 40, etc.). By way of another example, one or more nozzles 102 can be positioned along the frame 12 or the body 20 to protect hazards 202 not contained within an enclosure, such as tires and brakes. Because the nozzle 102 can be positioned in closer proximity to the hazards 202 than the nozzle 300 without sacrificing effective suppression area, the system 100 can be implemented more flexibly than a system that uses the nozzles 300. This facilitates placing the nozzles 102 in positions that are more convenient for installers and/or that more optimally cover the hazards 202. This can increase protection of the hazards 202 and reduce the total number of nozzles 102 required in the system 100 relative to a system that utilizes the nozzles 300. This can result in cost savings for the user (e.g., in reduced fuel costs, in increased vehicle capacities, in reduced costs for installation of the system 100, etc.).

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle and fire suppression system as shown in the various exemplary embodiments is illustrative only. Additionally, any element disclosed in one embodiment may be incorporated or utilized with any other embodiment disclosed herein. For example, the linear pressure detector 146 of the exemplary embodiment shown in at least FIG. 2 may be incorporated in the vehicle 10 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A vehicle, comprising:
    a chassis;
    a body coupled to the chassis and defining an enclosure;
    a plurality of tractive elements coupled to the chassis;
    an engine configured to output mechanical energy to drive at least one of the tractive elements, wherein the enclosure is an engine compartment that at least partially receives the engine, and wherein a surface is part of the engine;
    a fire suppression system, comprising:
        a fire suppression tank positioned outside the engine compartment and containing a volume of liquid fire suppressant;
        a pressurized cylinder positioned outside the engine compartment and containing a volume of pressurized expellant gas, wherein the pressurized cylinder is fluidly coupled to the fire suppression tank;
        a nozzle positioned in the engine compartment and having an outlet at least selectively fluidly coupled to the fire suppression tank and configured to release a spray of the liquid fire suppressant therefrom, wherein the nozzle has a spray angle between 110 and 130 degrees and an effective suppression area of at least 3 square feet at the surface;
        a fire detection device positioned within the engine compartment and configured to generate a signal in response to detecting a fire;
        a controller positioned within the engine compartment and configured to receive the signal from the fire detection device and generate an activator signal; and
        an activator configured to selectively release the pressurized expellant gas from the pressurized cylinder to pressurize the fire suppression tank and release the liquid fire suppressant from the fire suppression tank in response to receiving the activator signal such that at least a portion of the liquid fire suppressant passes through the outlet of the nozzle, wherein all of the liquid fire suppressant remains in the fire suppression tank until it is released by the activator, and
        wherein the nozzle is oriented such that the spray is directed toward the surface, and wherein the nozzle is positioned less than 8 inches away from the surface.

2. The vehicle of claim 1, wherein the nozzle is positioned at least 6 inches away from the surface.

3. The vehicle of claim 1, wherein the nozzle has a spray angle of approximately 120 degrees.

4. The vehicle of claim 1, wherein the nozzle has an effective suppression area of at least 7 square feet at the surface.

5. The vehicle of claim 1, further comprising a second nozzle coupled to the chassis and having an outlet at least selectively fluidly coupled to the fire suppression tank and configured to release a spray of the liquid fire suppressant therefrom, wherein the body includes an external surface, and wherein the second nozzle is positioned outside the body and oriented such that the spray is directed onto the external surface.

6. The vehicle of claim 1, wherein the vehicle is a haul truck.

7. The vehicle of claim 1, further comprising:
    a bed coupled to the chassis;
    an actuator configured to adjust a position of the bed;
    an equipment drive comprising a hydraulic pump and configured to supply pressurized hydraulic fluid to the actuator; and
    a second nozzle coupled to the chassis and having an outlet at least selectively fluidly coupled to the fire suppression tank and configured to release a spray of the liquid fire suppressant therefrom, wherein the second nozzle is oriented such that the spray is directed onto the equipment drive.

8. A fire suppression system for use with a vehicle including a surface, the fire suppression system comprising:
    a fire suppression tank containing a volume of liquid fire suppressant;
    a pressurized cylinder fluidly coupled to the fire suppression tank and containing a volume of pressurized expellant gas;
    a nozzle having an outlet at least selectively fluidly coupled to the fire suppression tank and configured to release a spray of the liquid fire suppressant therefrom, wherein the nozzle has a spray angle between 110 and 130 degrees and an effective suppression area of at least 3 square feet at the surface;
    a fire detection device configured to generate a signal in response to detecting a fire;
    a controller configured to receive the signal from the fire detection device and generate an activator signal; and
    an activator configured to selectively release the pressurized expellant gas from the pressurized cylinder to pressurize the fire suppression tank and release the liquid fire suppressant from the fire suppression tank in response to receiving the activator signal such that at least a portion of the liquid fire suppressant passes through the outlet of the nozzle, wherein all of the liquid fire suppressant remains in the fire suppression tank until it is released by the activator, and
    wherein the nozzle has a spray angle between 110 degrees and 130 degrees and is configured to be oriented such that the spray is directed toward the surface, and wherein the nozzle is configured to have an effective suppression area of at least 3 square feet at the surface when the nozzle is positioned less than 24 inches away from the surface.

9. The fire suppression system of claim 8, wherein the nozzle is configured to have the effective suppression area of at least 3 square feet at the surface when the nozzle is positioned between 6 inches and 24 inches away from the surface.

10. The fire suppression system of claim 8, wherein the nozzle is configured to have the effective suppression area of at least 3 square feet at the surface when the nozzle is positioned less than 8 inches away from the surface.

11. The fire suppression system of claim 8, wherein the nozzle has a spray angle of approximately 120 degrees.

12. The fire suppression system of claim 8, wherein the nozzle is configured to have an effective suppression area of at least 7 square feet at the surface when the nozzle is positioned less than 24 inches away from the surface.

13. The fire suppression system of claim 8, wherein the vehicle includes an enclosure, and wherein the nozzle and the surface are positioned within the enclosure.

14. The fire suppression system of claim 8, wherein the surface is an external surface of the vehicle and wherein the nozzle is oriented such that the spray is directed toward the external surface.

15. The fire suppression of claim 8, wherein the surface is an external surface of the vehicle and wherein the nozzle is oriented such that the spray is directed toward the external surface, wherein the fire suppression system further comprises a second nozzle having an outlet at least selectively fluidly coupled to the fire suppression tank and configured to release a spray of the liquid fire suppressant therefrom,
wherein the second nozzle has a spray angle between 110 degrees and 130 degrees and is configured to be oriented such that the spray is directed toward a second surface, wherein the second surface is an internal surface of the vehicle, and wherein the second nozzle is configured to have an effective suppression area of at least 3 square feet at the internal surface when the second nozzle is positioned less than 24 inches away from the internal surface.

16. A vehicle, comprising:
a chassis;
a body coupled to the chassis and defining an enclosure;
a plurality of tractive elements coupled to the chassis;
a driver extending within the enclosure and configured to output mechanical energy to drive at least one of the tractive elements, a portion of the driver defining a surface; and
a fire suppression system, comprising:
    a fire suppression tank containing a volume of liquid fire suppressant;
    a pressurized cylinder fluidly coupled to the fire suppression tank and containing a volume of pressurized expellant gas;
    a nozzle having an outlet at least selectively fluidly coupled to the fire suppression tank and configured to release a spray of the liquid fire suppressant therefrom, wherein the outlet is positioned within the enclosure; and
    an activator configured to selectively release the liquid fire suppressant from the fire suppression tank such that at least a portion of the liquid fire suppressant passes through the outlet of the nozzle, wherein all of the liquid fire suppressant remains in the fire suppression tank until it is released by the activator,
wherein the nozzle is oriented such that the spray is directed toward the surface, and wherein the nozzle is positioned less than 8 inches away from the surface and at least 6 inches away from the surface,
wherein the nozzle has a spray angle of approximately 120 degrees, and
wherein the nozzle is configured to have an effective suppression area of at least 3 square feet at the surface.

17. The vehicle of claim 16, wherein the nozzle is configured to have an effective suppression area of at least 7 square feet.

18. The vehicle of claim 16, further comprising a second nozzle configured to release a second spray of the liquid fire suppressant therefrom, and wherein the second nozzle (a) is positioned less than 8 inches away from the surface and at least 6 inches away from the surface, (b) has a spray angle of approximately 120 degrees, and (c) is configured to have an effective suppression area of at least 3 square feet at the surface.

19. The vehicle of claim 16, further comprising a second nozzle coupled to the chassis and having an outlet at least selectively fluidly coupled to the fire suppression tank and configured to release a spray of the liquid fire suppressant therefrom, wherein the body includes an external surface, and wherein the second nozzle is positioned outside the body and oriented such that the spray is directed onto the external surface.

20. The vehicle of claim 16, further comprising:
a bed coupled to the chassis;
an actuator configured to adjust a position of the bed;
an equipment drive comprising a hydraulic pump and configured to supply pressurized hydraulic fluid to the actuator; and
a second nozzle coupled to the chassis and having an outlet at least selectively fluidly coupled to the fire suppression tank and configured to release a spray of the liquid fire suppressant therefrom, wherein the second nozzle is oriented such that the spray is directed onto the equipment drive.

\* \* \* \* \*